UNITED STATES PATENT OFFICE

ALBERT VERLEY, OF PARIS, AND EDOUARD URBAIN AND ANDRÉ FEIGE, OF GENTILLY, FRANCE.

MANUFACTURE OF CAMPHOL ESTERS.

No. 907,428.  Specification of Letters Patent.  Patented Dec. 22, 1908.

Application filed August 20, 1907. Serial No. 389,388.

*To all whom it may concern:*

Be it known that we, ALBERT VERLEY, EDOUARD URBAIN, and ANDRÉ FEIGE, citizens of the Republic of France, and residents, the first of 27 Rue Notre-Dame de Nazareth, Paris, and the two others of Avenue de la République, Gentilly, Seine, in the said Republic, chemists, have invented a new and useful Improvement in Manufacture of Camphol Esters, of which the following is a specification.

This invention relates to the manufacture of esters of camphol from camphene or a mixture of terpenes containing camphene.

The classical process for the preparation of bornyl acetate, due to Messrs. Bertram and Walbaum, consists in mixing 100 parts of camphene, 250 parts of glacial acetic acid and 10 parts of sulfuric acid of 50 per cent. strength, and heating the mixture for some hours at 50°–60° C. while stirring until dissolution occurs. It would be supposed that in this process, after elimination of the sulfuric acid by adding barium acetate, the acetic acid could be recovered by distillation. These operations, however, are long and costly, and the acid recovered is no longer glacial acetic acid and cannot be used again for the same purpose; on the other hand the large excess of acetic acid used only serves as a solvent.

The manufacture of esters of camphol such as bornyl acetate, which forms the subject matter of the present invention, is illustrated by the following example:—An aqueous sulfuric acid of 60–66 per cent. strength is first prepared. With 450 parts of this acid are mixed 100 parts of camphene, or of terpenes containing camphene, and 100 parts of concentrated acetic acid. The mixture is agitated in a mixer for about one hour at a temperature of 20°–30° C., and is then poured into a separating apparatus. It forms two layers, the upper of which is about 99 per cent. camphol acetate containing some traces of borneol, the lower layer being sulfuric acid and unchanged acetic acid. After separating the upper layer it suffices to introduce into the lower layer the theoretical proportion of acetic acid for 100 parts of camphene, to make it suitable for treating more camphene. The yield of this process is about 99 per cent. By this process, therefore, there is used only the quantity of acid theoretically necessary for the formation of the camphol esters desired. The manufacture of bornyl acetate has been described merely as an example; formate, the butyrate, propionate or the like can be prepared in similar manner.

What we claim as our invention is:—

The process of manufacturing camphol esters, which consists in, mixing camphene, water, a monobasic acid and sulfuric acid; causing them to react by a mechanical agitation at a temperature of from 20 to 30° centigrade; separating the camphol ester by pouring off; adding to the prime mixture a quantity of camphene and monobasic acid equal to that which has disappeared; and indefinitely repeating the above operations.

In testimony, that we claim the foregoing as our invention, we have signed our names in presence of two witnesses, this 7th day of August 1907.

ALBERT VERLEY.
EDOUARD URBAIN.
ANDRÉ FEIGE.

Witnesses:
DEAN B. MASON,
ALCIDE FABE.